United States Patent
Kim et al.

(10) Patent No.: US 8,117,352 B2
(45) Date of Patent: Feb. 14, 2012

(54) APPARATUS AND METHOD FOR SELECTING WIRELESS CONNECTIVITY IN A WIRELESS COMMUNICATION TERMINAL

(75) Inventors: Hyun-Soo Kim, Suwon-si (KR); Jae-Ho Kim, Seoul (KR)

(73) Assignee: Samsung Electronics Co., Ltd (KR)

( * ) Notice: Subject to any disclaimer, the term of this patent is extended or adjusted under 35 U.S.C. 154(b) by 113 days.

(21) Appl. No.: 12/621,180

(22) Filed: Nov. 18, 2009

(65) Prior Publication Data

US 2010/0125680 A1    May 20, 2010

(30) Foreign Application Priority Data

Nov. 18, 2008 (KR) .................. 10-2008-0114559

(51) Int. Cl.
*G06F 3/00* (2006.01)
(52) U.S. Cl. .................. 710/11; 710/17
(58) Field of Classification Search .................. 710/11, 710/17
See application file for complete search history.

(56) References Cited

U.S. PATENT DOCUMENTS

| | | | |
|---|---|---|---|
| 6,185,635 B1 * | 2/2001 | O'Loughlin et al. | 710/31 |
| 6,209,050 B1 * | 3/2001 | Iho et al. | 710/301 |
| 6,917,594 B2 * | 7/2005 | Feuerstraeter et al. | 370/244 |
| 6,970,703 B2 * | 11/2005 | Fuchs et al. | 455/426.1 |
| 7,305,289 B2 * | 12/2007 | Gessner et al. | 701/33 |
| 7,360,003 B2 * | 4/2008 | Toombs et al. | 710/301 |
| 7,441,053 B2 * | 10/2008 | Mylly et al. | 710/10 |
| 7,856,035 B2 * | 12/2010 | Pierce et al. | 370/473 |
| 2005/0105530 A1 * | 5/2005 | Kono | 370/395.5 |
| 2009/0221310 A1 * | 9/2009 | Chen et al. | 455/466 |
| 2010/0211698 A1 * | 8/2010 | Krishnaswamy | 710/11 |

\* cited by examiner

*Primary Examiner* — Chun-Kuan Lee
*Assistant Examiner* — Ronald Modo
(74) *Attorney, Agent, or Firm* — The Farrell Law Firm, P.C.

(57) ABSTRACT

An apparatus and a method for providing an interworking service with a peripheral device in a Mobile Station (MS) supporting one or more wireless connectivity protocols are provided. Information on an execution environment of an application program for the interworking service is checked when the application program for performing the interworking service with the peripheral device is executed. A wireless connectivity protocol is selected from among the one or more wireless connectivity protocols for performing the interworking service with the peripheral device using the information on the execution environment of the application program.

12 Claims, 4 Drawing Sheets

APPARATUS AND METHOD FOR SELECTING WIRELESS CONNECTIVITY IN A WIRELESS COMMUNICATION TERMINAL

PRIORITY

This application claims priority under 35 U.S.C. §119(a) to a Korean Patent Application filed in the Korean Intellectual Property Office on Nov. 18, 2008 and assigned Serial No. 10-2008-0114559, the content of which is incorporated herein by reference.

BACKGROUND OF THE INVENTION

1. Field of the Invention

The present invention relates generally to an apparatus and method for providing an interworking service with a peripheral device in a mobile communication terminal, or Mobile Station (MS). More particularly, the present invention relates to an apparatus and method for selecting wireless connectivity for interworking with a peripheral device in an MS.

2. Description of the Related Art

As wireless communication technology develops further, wireless connectivity protocols also develop that provide an interworking service between an MS and a peripheral device. For example, developed wireless connectivity protocols include, for example, Bluetooth, ZigBee, and Ultraband WideBand (UWB), which are available for providing the interworking service between the MS and the peripheral device.

In the developed wireless connectivity protocols, a transmission distance and bandwidth capable of supporting a service are fixed as illustrated in FIG. 1.

FIG. 1 is a diagram illustrating transmission distances and bandwidths of wireless connectivity protocols.

As illustrated in FIG. 1, a UWB 100 supports transmission distances of 1 to 10 meters and bandwidths of 100 Mbps to 1 Gbps.

A Wireless Local Area Network (WLAN) 110 supports transmission distances of 10 to 100 meters and bandwidths of 1 to 100 Mbps.

Bluetooth protocol 120 supports transmission distances of 1 to 10 meters and bandwidths of about 5 Mbps.

ZigBee protocol supports transmission distances of a few centimeters to 10 meters or more and bandwidths less than 1 Mbps.

As described above with respect to FIG. 1, serviceable transmission distances and bandwidths are fixed in conventional wireless connectivity technology. Therefore, when an application program provides an interworking service with a peripheral device, a wireless connectivity protocol that is to be used for service provision is fixed depending on the type of service.

Thus, either MSs are limited in driving the application program or resources are unnecessarily wasted to provide an interworking service with a peripheral device. For example, when a channel state between the MS and the peripheral device cannot provide Bluetooth, the MS cannot provide an interworking service with a peripheral device until an application program is used that has a wireless connectivity protocol fixed to Bluetooth. Further, MSs may continuously attempt interworking with the peripheral device through Bluetooth, thereby wasting resources.

SUMMARY OF THE INVENTION

The present invention is designed to address at least the above problems and/or disadvantages and to provide at least the advantages below. Accordingly, one aspect of the present invention provides an apparatus and method for selecting wireless connectivity for interworking with a peripheral device in consideration of a state of an MS.

Another aspect of the present invention is to provide an apparatus and method for selecting wireless connectivity for interworking with a peripheral device in consideration of a state of an MS, the kind of service, and quality information on wireless connectivity in an MS.

A further aspect of the present invention is to provide an apparatus and method for applying different weights to a state of an MS, the kind of service, and quality information on wireless connectivity and selecting wireless connectivity for interworking with a peripheral device in an MS.

According to one aspect of the present invention, a method for providing an interworking service with a peripheral device in a Mobile Station (MS) supporting one or more wireless connectivity protocols is provided. Information on an execution environment of an application program for the interworking service is checked when the application program for performing the interworking service with the peripheral device is executed. A wireless connectivity protocol is selected from among the one or more wireless connectivity protocols for performing the interworking service with the peripheral device using the information on the execution environment of the application program.

According to another aspect of the present invention, an apparatus for providing an interworking service with a peripheral device in a Mobile Station (MS) supporting one or more wireless connectivity protocols is provided. The apparatus includes an application program driver, a content detection middleware, a file manager, and a hardware device. The application program driver drives an application program. The content detection middleware selects a wireless connectivity protocol for performing the interworking service with the peripheral device using information on an execution environment of the application program for the interworking service, when the application program for performing the interworking service with the peripheral device is driven in the application program driver. The file manager stores and manages at least one content of at least one application program driven in the application program driver and, according to a request of the content detection middleware, transmits content state information of the application program driven in the application program driver, to the content detection middleware. The hardware device transmits at least one of internal state information on the MS and quality information of the one or more wireless connectivity protocols to the content detection middleware according to a request of the content detection middleware and exchanges signals with the peripheral device, when the application program for performing the interworking service with the peripheral device is driven in the application program driver.

BRIEF DESCRIPTION OF THE DRAWINGS

The above and other aspects, features and advantages of the present invention will become more apparent from the following detailed description when taken in conjunction with the accompanying drawings in which.

DETAILED DESCRIPTION OF EMBODIMENTS OF THE PRESENT INVENTION

Figure 1:
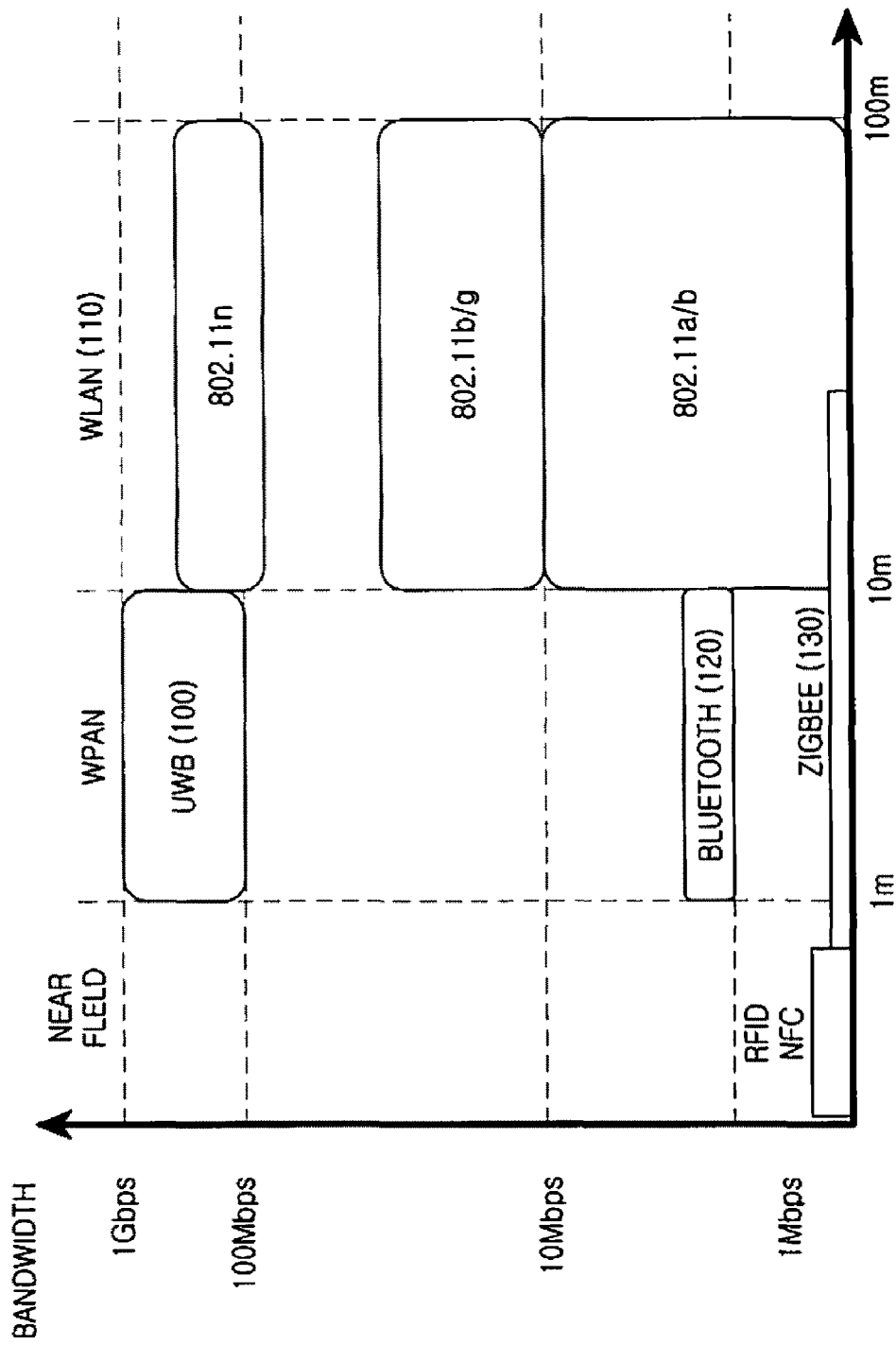
FIG. 1 is a diagram illustrating transmission distances and bandwidths of wireless connectivity protocols.

Embodiments of the present invention are described in detail with reference to the accompanying drawings. The same or similar components may be designated by similar reference numerals although they are illustrated in different drawings. Detailed descriptions of constructions or processes known in the art may be omitted to avoid obscuring the subject matter of the present invention. Terms described below, which are defined considering functions in the embodiments of the present invention, can be defined differently depending on user and operator intention or practice. Therefore, the terms should be defined on the basis of the disclosure throughout this specification.

A method for selecting of a wireless connectivity protocol for interworking with a peripheral device is described below according to an embodiment of the present invention. The method is dependent upon an execution environment of an application program in a Mobile Station(MS).

The embodiments of the present invention assume that an MS selects a wireless connectivity protocol for interworking with a peripheral device considering an execution environment of an application program. The execution environment of the application program includes at least one of a state of the MS, the type of service, and wireless connectivity quality information.

Figure 2:
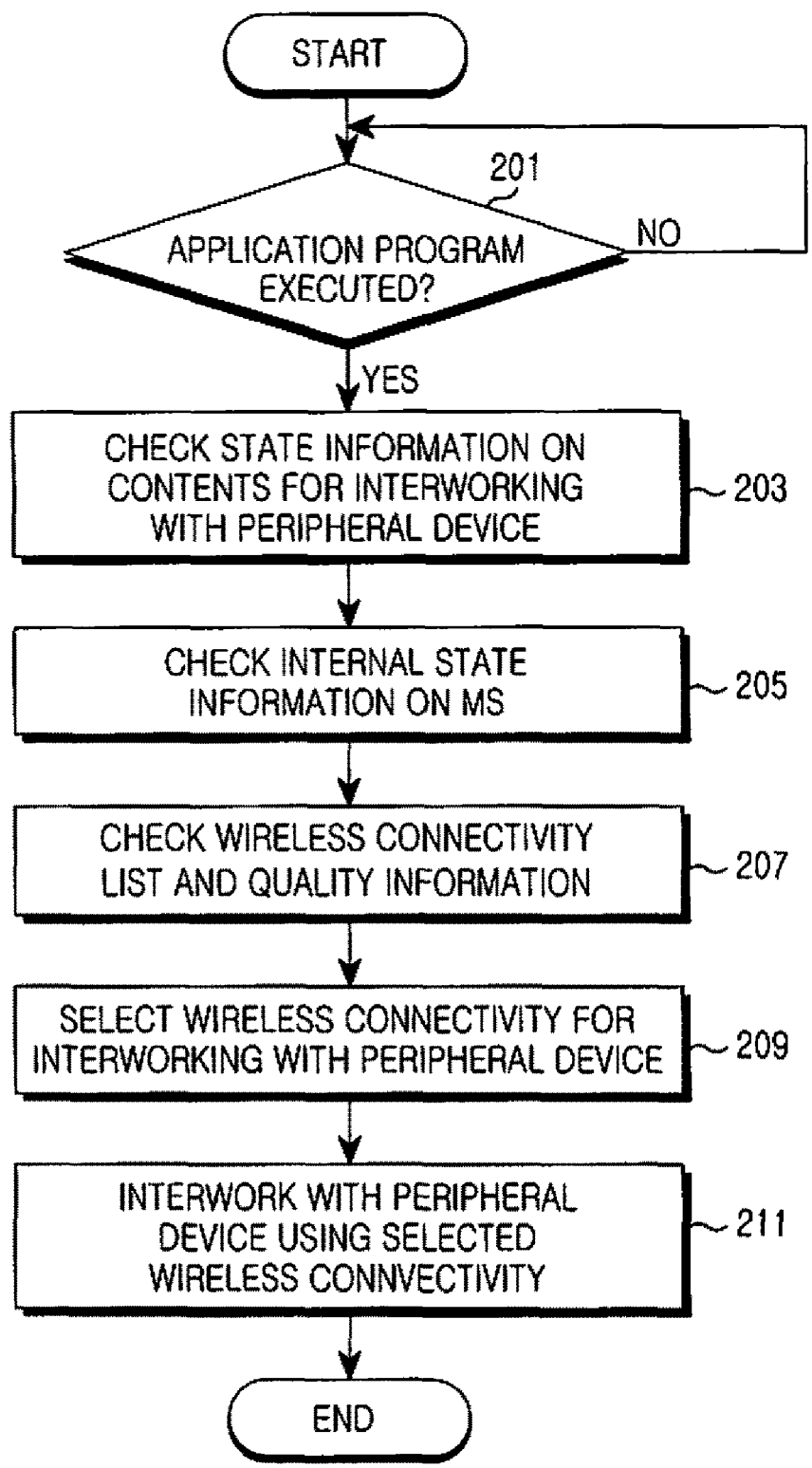
FIG. 2 is a flow diagram illustrating a procedure for selecting a wireless connectivity protocol in an MS, according to an embodiment of the present invention.

FIG. 2 is a flow diagram illustrating a procedure for selecting a wireless connectivity protocol in an MS, according to an embodiment of the present invention.

Referring to FIG. 2, in step 201, the MS determines whether to execute an application program for an interworking service with a peripheral device. For example, the MS determines whether the application program for providing the interworking service with the peripheral device is selected by a user.

If the application program for the interworking service with the peripheral device is executed, the MS determines state information of contents required for interworking with the peripheral device through the application program in step 203. For example, the MS determines a capacity and an attribute of the contents.

The MS determines internal state information of the MS in step 205. For example, the MS determines a battery state of the MS.

In step 207, the MS successively enables wireless connectivity protocols available to the MS and searches wireless connectivity protocols installed in peripheral devices. Through step 207, the MS generates a list of available wireless connectivity protocols and quality information for each protocol. For example, when enabling ZigBee, the MS checks quality information of ZigBee using a beacon signal. In another example, when enabling a UWB, the MS periodically transmits/receives signals with peripheral devices equipped with UWBs and checks quality information of UWBs. Further, in the case of Bluetooth, the MS checks quality information of the Bluetooth using a pairing message. The quality information includes, for example, a Receive Strength Signal Indication (RSSI) or a Radio Frequency (RF) link margin.

After generating the wireless connectivity protocol list and quality information, the MS selects a wireless connectivity protocol for providing an interworking service with a peripheral device using the state information of the contents, the internal state information of the MS, and the wireless connectivity protocol list and quality information. For example, as shown in Table 1, the MS allocates a wireless connectivity protocol order to the state information of the contents, the internal state information of the MS, and the wireless connectivity protocol list and quality information.

TABLE 1

| LCV1 | LCV2 |
|---|---|
| Capacity of contents | Connectivity order 1 |
| Attribute of contents | |
| Battery level | Connectivity order 2 |
| List of wireless connectivity | Connectivity order 3 |
| RF link quality | |

As shown in Table 1, the MS allocates connectivity order 1 to the state information of the contents determined in step 203. The MS allocates connectivity order 2 to the internal state information of the MS determined in step 205. The MS allocates connectivity order 3 to the wireless connectivity protocol list and quality information checked in step 207.

When assuming that 'a', 'b', 'c', and 'd' denote wireless connectivity protocols available in the MS, a connectivity order of the wireless connectivity protocols can be shown in Table 2 below.

TABLE 2

| | LCV2 | | |
|---|---|---|---|
| Order | Connectivity order 1 | Connectivity order 2 | Connectivity order 3 |
| 1 | b | a | A |
| 2 | a | b | C |
| 3 | c | c | B |
| 4 | d | d | D |

In Table 2, the wireless connectivity protocol 'b' is ranked highest for the connectivity order 1 relating to the state information of contents. The connectivity order 2 relating to the internal state information of the MS and the connectivity order 3 relating to the wireless connectivity protocol list and quality information both rank the wireless connectivity protocol 'a' highest.

The MS allocates a different weight to each connectivity order and selects a wireless connectivity protocol for providing an interworking service with a peripheral device in accordance with the connectivity orders and weights. For example, as shown in Table 3 below, the MS can allocate a different weight to each connectivity order.

TABLE 3

| Kind of connectivity order | Weight |
|---|---|
| Connectivity order 1 | 3 |
| Connectivity order 2 | 5 |
| Connectivity order 3 | 1 |

In Table 3, the MS has allocated the highest weight to the connectivity order 2 and the lowest weight to connectivity order 3.

The MS can calculate numerical values for available wireless connectivity protocols according to Tables 2 and 3 as shown in Equation (1) below:

$$a => (3\times2)+(5\times1)+(1\times1)=12$$
$$b => (3\times1)+(5\times2)+(1\times3)=16$$
$$c => (3\times3)+(5\times3)+(1\times2)=26$$
$$d => (3\times4)+(5\times4)+(1\times4)=36 \quad (1)$$

Through Equation (1), the MS calculates a highest numerical value for the wireless connectivity protocol 'd' and a lowest numerical value for the wireless connectivity protocol 'a'. the MS selects a wireless connectivity protocol for providing an interworking service with a peripheral device in consideration of the calculated numerical values for the wireless connectivity protocols. For example, the MS may select the wireless connectivity protocol 'a' having the lowest numerical value. In another example, the MS may select the wireless connectivity protocol having the highest numerical value.

Referring again to FIG. 2, after selecting the wireless connectivity protocol for providing the interworking service with the peripheral device in step 209, the MS provides an interworking service with a peripheral device using the selected wireless connectivity protocol in step 211.

In the aforementioned embodiment of the present invention, the MS selects a wireless connectivity protocol for providing an interworking service with a peripheral device in consideration of a numerical value.

In another embodiment of the present invention, the MS displays numerical values of wireless connectivity protocols on a display unit such that a user can select a wireless connectivity protocol for providing an interworking service with a peripheral device.

Figure 3:
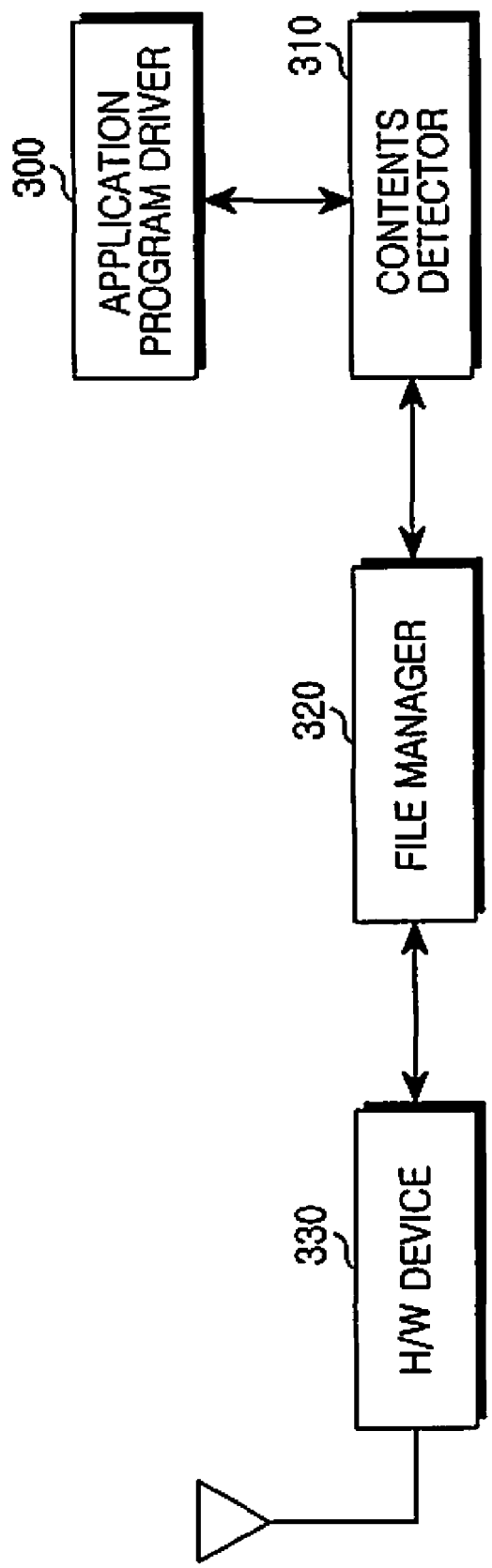
FIG. 3 is a block diagram illustrating a construction of an MS, according to an embodiment of the present invention.

FIG. 3 is a block diagram illustrating a construction of an MS, according to an embodiment of the present invention.

As illustrated in FIG. 3, the MS includes an application program driver 300, a content detector 310, a file manager 320, and a Hard Ware (H/W) device 330.

The application program driver 300 drives an application program selected by a user. If an application program for an interworking service with a peripheral device is selected by the user, the application program driver 300 sends a request for wireless connectivity to the content detector 310. The application program driver 300 drives the application program selected by the user using a wireless connectivity protocol received from the content detector 310.

When the application program driver 300 sends the request for wireless connectivity to the content detector 310, the content detector 310 selects a wireless connectivity protocol for an interworking service with a peripheral device using at least one of state information of contents, internal state information of an MS, and wireless connectivity protocol list and quality information. The content detector 310 determines the state information of the contents required for interworking with the peripheral device in the application program driver 300 from the file manager 320. The content detector 310 also determines the internal state information of the MS and generates the wireless connectivity protocol list and quality information from the H/W device 330. The content detector 310 represents a middleware for connecting the application program driver 300 and driving of the H/W device 330.

The file manager 320 stores and manages content information for driving an application program in the MS.

The H/W device 330 is a device for a physical layer operation of the MS. Under the control of the content detector 310, the H/W device 330 checks and transmits internal state information of the MS and wireless connectivity protocol list and quality information to the content detector 310. For example, if the content detector 310 sends a request for internal state information of the MS, the H/W device 330 checks a battery level and transmits the checked battery level to the content detector 310. Also, if the content detector 310 sends a request for a list of wireless connectivity protocols, the H/W device 330 successively enables wireless connectivity protocols available to the MS and searches wireless connectivity protocols installed in peripheral devices. The H/W device 330 generates the available wireless connectivity protocol list and quality information, and transmits the generated list and quality information to the content detector 310.

If the application program driver 300 drives an application program for an interworking service with a peripheral device, the H/W device 330 transmits/receives a signal with the peripheral device using the wireless connectivity protocol selected by the content detector 310.

In the embodiment of the present invention described above, the application program driver 30 drives an application program selected by a user using wireless connectivity received from the content detector 310.

In another embodiment of the present invention, the content detector 310 transmits numerical values of wireless connectivity protocols, calculated in Equation (1) above, to the application program driver 300. Accordingly, the application program driver 300 controls a display of the numerical values of the wireless connectivity protocols on a display unit such that a user can select a wireless connectivity protocol for providing an interworking service with a peripheral device.

Figure 4:
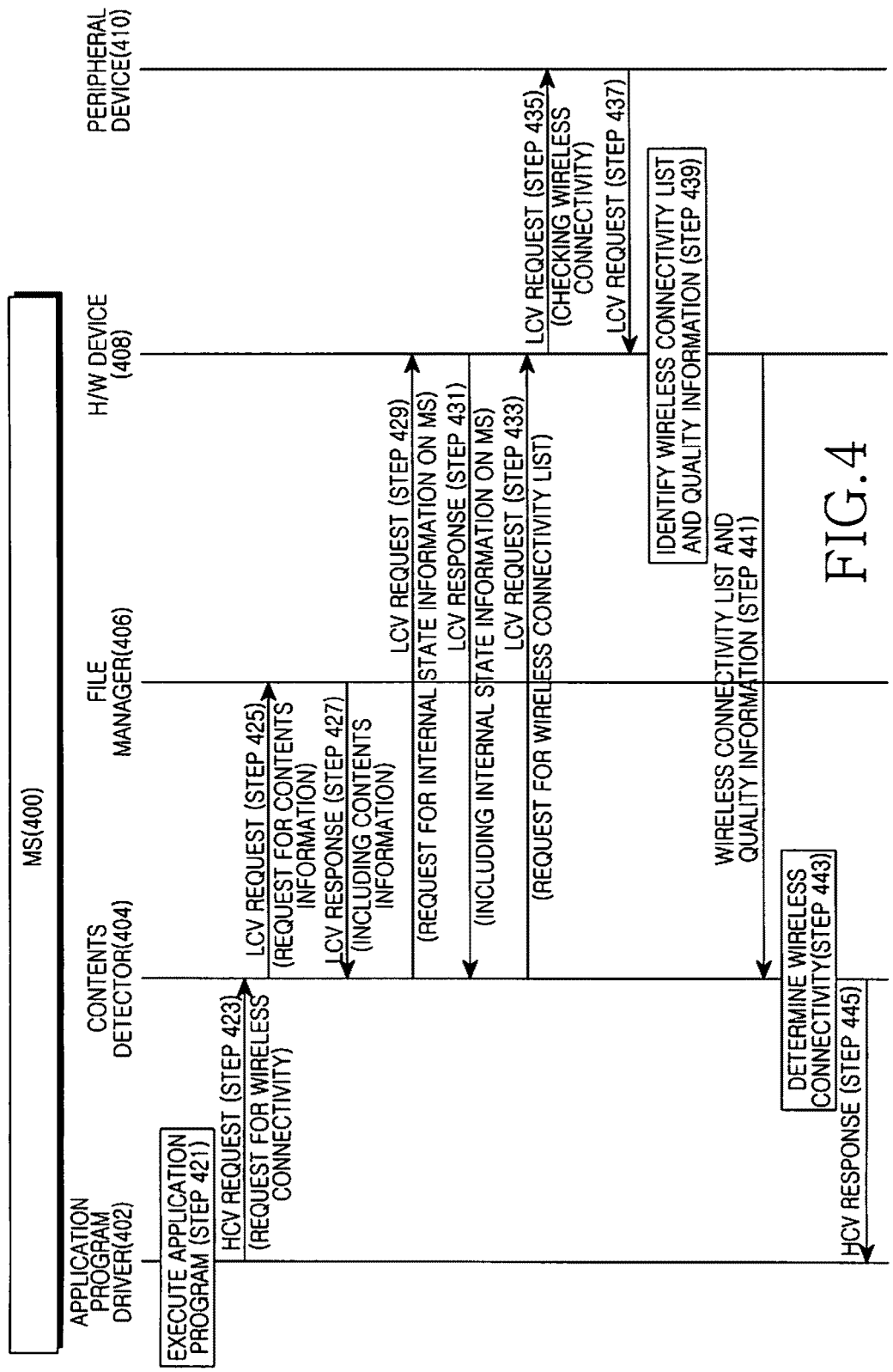
FIG. 4 is a ladder diagram illustrating a signaling procedure for selecting a wireless connectivity protocol in an MS, according to an embodiment of the present invention.

FIG. 4 is a ladder diagram illustrating a signaling procedure for selecting a wireless connectivity protocol in an MS, according to an embodiment of the present invention.

As illustrated in FIG. 4, if an application program for providing an interworking service with a peripheral device is executed by a user in step 421, an application program driver 402 of an MS 400 sends a request for wireless connectivity to a content detector 404 in step 423. Specifically, the application program driver 402 sends a request for a High-level Context Variable (HCV) for driving the application program, to the content detector 404.

When the HCV request message is received, the content detector 404 sends a request for state information on contents required for interworking with a peripheral device through the application program selected by the user to a file manager 406 in step 425. Specifically, the content detector 404 sends the file manager 406 a request for a Low-level Context Variable (LCV) that represents the state information of the contents required for interworking with the peripheral device.

In step 427, in response to the request of the content detector 404, the file manager 406 transmits state information of contents required for interworking with a peripheral device through the application program selected by the user to the content detector 404.

The content detector 404 sends a request for internal state information of the MS to an H/W device 408 in step 429. Specifically, the content detector 404 sends a request for LCV that represents the internal state information of the MS to the H/W device 408.

In step 431, in response to the request of the content detector 404, the H/W device 408 transmits internal state information of the MS to the content detector 404.

The content detector 404 sends a request for a list of wireless connectivity protocols to the H/W block 408 in step 433.

Specifically, the content detector 404 sends a request for LCV that represents the list of wireless connectivity protocols to the H/W device 408.

In response to the request of the content detector 404, in steps 435 and 437, the H/W device 408 successively enables wireless connectivity protocols available to the MS 400 and searches wireless connectivity protocols installed in peripheral devices.

In step 439, the H/W device 408 generates available wireless connectivity protocol list and quality information. In step 441, the H/W device 408 transmits the wireless connectivity protocol list and quality information to the content detector 404. The quality information may include, for example, an RSSI of wireless connectivity or an RF link margin.

In step 443, the content detector 404 selects a wireless connectivity protocol for providing an interworking service with a peripheral device using the state information of the contents, the internal state information of the MS, and the wireless connectivity protocol list and quality information. For example, the content detector 404 allocates a connectivity order to the state information of the contents, the internal state information of the MS, and the wireless connectivity protocol list and quality information. The content detector 404 allocates a different weight to each connectivity order and selects a wireless connectivity protocol for providing an interworking service with a peripheral device.

In step 445, the content detector 404 transmits the selected wireless connectivity protocol to the application program driver 402. The content detector 404 transmits an HCV for driving an application program to the application program driver 402.

In the aforementioned embodiment of the present invention, the content detector 404 selects a wireless connectivity protocol for providing an interworking service with a peripheral device in consideration of the state information of the contents, the internal state information of the MS, and the wireless connectivity protocol list and quality information.

In another embodiment of the present invention, the content detector 404 transmits numerical values of wireless connectivity protocols that are calculated using state information of contents, internal state information of an MS, and wireless connectivity protocol list and quality information as shown in Equation (1) above, to the application program driver 402. Accordingly, the application program driver 402 controls the display of the numerical values of the wireless connectivity protocols such that a user can select a wireless connectivity protocol for providing an interworking service with a peripheral device.

As described above, an embodiment of the present invention can select a wireless connectivity protocol for interworking with a peripheral device in consideration of at least one of a state of an MS, the type of service, and wireless connectivity quality information in an MS, thereby adaptively applying wireless connectivity protocols to an execution environment of an application program without fixing wireless connectivity protocols to the application program.

While the invention has been shown and described with reference to certain embodiments thereof, it will be understood by those skilled in the art that various changes in form and detail may be made therein without departing from the spirit and scope of the invention as defined by the appended claims.

What is claimed is:

1. A method for providing an interworking service with a peripheral device in a Mobile Station (MS) supporting one or more wireless connectivity protocols, the method comprising the steps of:

checking information regarding an execution environment of an I application program for the interworking service, when the application program for performing the interworking service with the peripheral device is executed; and selecting a wireless connectivity protocol from among the one or more wireless connectivity protocols for performing the interworking service with the peripheral device using the information on the execution environment of the application program, wherein selecting the wireless connectivity protocol includes:

determining an order of the one or more wireless connectivity protocols for each piece of information in the information regarding the execution environment of the application program;

calculating a numerical value for each of the one or more wireless connectivity protocols using a weight allocated to each determined wireless connectivity protocol order; and selecting the wireless connectivity protocol for providing the interworking service with the peripheral device based on the numerical values, wherein the information regarding the execution environment of the application program comprises at least one of state information of contents required for providing the interworking service with the peripheral device, internal state information of the MS, and quality information of the one or more wireless connectivity protocols.

2. The method of claim 1, wherein the state information of the contents comprises at least one of a capacity of the contents for providing the interworking service with the peripheral device and an attribute of the contents.

3. The method of claim 1, wherein the internal state information of the MS comprises battery state information of the MS.

4. The method of claim 1, further comprising, before determining the order of the one or more wireless connectivity protocols, searching wireless connectivity protocols available at the MS, wherein determining the order of the one or more wireless connectivity protocols comprises determining the order of wireless connectivity protocols available at the MS for each piece of information in the information regarding the execution environment of the application program.

5. The method of claim 1, further comprising, after calculating the numerical values for each of the one or more wireless connectivity protocols, displaying the numerical values of the one or more wireless connectivity protocols on a display unit; and checking the wireless connectivity protocol selected by a user.

6. The method of claim 1, further comprising, after selecting the wireless connectivity protocol, providing the interworking service with the peripheral device using the selected wireless connectivity protocol.

7. An apparatus for providing an interworking service with a peripheral device in a Mobile Station (MS) supporting one or more wireless connectivity protocols, the apparatus comprising:

an application program driver for driving an application program;

a content detection middleware for selecting a wireless connectivity protocol for performing the interworking service with the peripheral device using information regarding an execution environment of the application program for the interworking service, when the application program for performing the interworking service with the peripheral device is driven in the application program driver;

a file manager for storing and managing at least one content of at least one application program driven in the application program driver and, according to a request of the content detection middleware, transmitting content state information of the application program driven in the application program driver to the content detection middleware; and a hardware device for, transmitting at least one of internal state information of the MS and quality information on the one or more wireless connectivity protocols to the content detection middleware according to a request of the contents detection middleware and exchanging signals with the peripheral device, when the application program for performing the interworking service with the peripheral device is driven in the application program driver, wherein the content detection middleware determines an order of wireless connectivity protocols for each piece of information in the information regarding the execution environment of the application program, and selects the wireless connectivity protocol for providing tile interworking service with the peripheral device based on a numerical value that is determined using a weight allocated to each order of wireless connectivity protocols, wherein the information regarding the execution environment comprises at least one of state information on contents required for providing the interworkinq service, internal state information of the MS, and quality information on the one or more wireless connectivity protocols.

8. The apparatus of claim 7, wherein the file manager checks and transmits at least one of a capacity of contents for providing the interworking service with the peripheral device and an attribute of the contents to the content detection middleware according to the request of the content detection middleware.

9. The apparatus of claim 7, wherein the hardware device checks and transmits battery state information of the MS to the content detection middleware according to the request of the content detection middleware.

10. The apparatus of claim 7, wherein the hardware device enables at least one wireless connectivity protocol supported by the MS, searches wireless connectivity protocols installed in the peripheral device, and determines quality information of the wireless connectivity protocols installed in the peripheral device, according to the request of the content detection middleware.

11. The apparatus of claim 7, wherein the content detection middleware determines an order of wireless connectivity protocols for each piece of information in the information regarding the execution environment of the application program, and transmits to the application program driver a numerical value for each wireless connectivity protocol that is determined using a weight allocated to each order of wireless connectivity protocols.

12. The apparatus of claim 11, wherein the application program driver receives from the content detection middleware the numerical values of the wireless connectivity protocols supportable by the MS, and controls display of the received numerical values of the wireless connectivity protocols on a display unit, and checks the wireless connectivity protocol selected by a user.

\* \* \* \* \*